(12) United States Patent
Liang et al.

(10) Patent No.: US 12,305,033 B2
(45) Date of Patent: May 20, 2025

(54) ETHYLENE-VINYL ALCOHOL COPOLYMER RESIN PARTICLE COMPOSITION, ETHYLENE-VINYL ALCOHOL COPOLYMER FILM FORMED THEREFROM, AND MULTILAYER STRUCTURE

(71) Applicant: CHANG CHUN PETROCHEMICAL CO., LTD., Taipei (TW)

(72) Inventors: Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 18/571,181

(22) PCT Filed: Jun. 16, 2022

(86) PCT No.: PCT/CN2022/099144
§ 371 (c)(1),
(2) Date: Dec. 15, 2023

(87) PCT Pub. No.: WO2022/262806
PCT Pub. Date: Dec. 22, 2022

(65) Prior Publication Data
US 2024/0309185 A1  Sep. 19, 2024

(30) Foreign Application Priority Data

Jun. 16, 2021 (CN) .......................... 202110666690.4
Jun. 16, 2021 (CN) .......................... 202110666705.7
Jun. 16, 2021 (CN) .......................... 202110666706.1
Jun. 16, 2021 (CN) .......................... 202110668489.X
Jun. 16, 2021 (CN) .......................... 202110668496.X

(51) Int. Cl.
C08L 29/04 (2006.01)
B32B 7/12 (2006.01)
(Continued)

(52) U.S. Cl.
CPC ................ C08L 29/04 (2013.01); B32B 7/12 (2013.01); B32B 27/08 (2013.01); B32B 27/306 (2013.01);
(Continued)

(58) Field of Classification Search
CPC .................................. C08L 29/02; C08L 29/04
See application file for complete search history.

(56) References Cited

U.S. PATENT DOCUMENTS 10,711,124 B1 * 7/2020 Wu .......................... C08L 29/04
10,961,378 B1 * 3/2021 Lin ...................... C08L 23/0853
(Continued)

FOREIGN PATENT DOCUMENTS

CA  1337233 C  10/1995
CN  111944262 A  11/2020
(Continued)

Primary Examiner — Liam J Heincer
(74) Attorney, Agent, or Firm — MUNCY, GEISSLER, OLDS & LOWE, P.C.

(57) ABSTRACT

An ethylene-vinyl alcohol copolymer (EVOH) resin particle composition, an EVOH film formed therefrom, and a multilayer structure containing the same. The EVOH resin particle composition includes: a first EVOH resin particle having a peak material volume (Vmp) of 0.00001~6 $\mu m^3/\mu m^2$; and a second EVOH resin particle having a peak material volume (Vmp) of 0.00015~20 $\mu m^3/\mu m^2$. This can improve the workability and mechanical properties of the EVOH composition when it is made into a film.

16 Claims, 1 Drawing Sheet

(51) Int. Cl.
  *B32B 27/08*  (2006.01)
  *B32B 27/30*  (2006.01)
  *B32B 27/32*  (2006.01)
  *C08J 5/18*  (2006.01)
  *C08L 23/0846*  (2025.01)
(52) U.S. Cl.
  CPC ................ *B32B 27/32* (2013.01); *C08J 5/18* (2013.01); *C08L 23/0846* (2013.01); *B32B 2250/05* (2013.01); *B32B 2250/246* (2013.01); *B32B 2250/40* (2013.01); *B32B 2307/7244* (2013.01); *B32B 2307/738* (2013.01); *C08J 2329/04* (2013.01); *C08J 2429/04* (2013.01); *C08L 2203/16* (2013.01); *C08L 2205/14* (2013.01)

(56) References Cited

U.S. PATENT DOCUMENTS

| | | | | |
|---|---|---|---|---|
| 11,021,599 B1* | 6/2021 | Liang | ................... | B32B 27/32 |
| 11,124,642 B1* | 9/2021 | Su | ................... | C08K 5/098 |
| 11,746,170 B2* | 9/2023 | Liang | ................... | C08F 8/12 |
| | | | | 428/476.3 |
| 2013/0184136 A1* | 7/2013 | Bekele | ................... | B32B 27/32 |
| | | | | 427/322 |
| 2022/0143959 A1* | 5/2022 | Yoshida | ................... | B29C 48/10 |
| 2022/0403076 A1* | 12/2022 | Liang | ................... | C08F 216/06 |
| 2022/0403077 A1* | 12/2022 | Liang | ................... | B32B 27/32 |
| 2022/0403078 A1* | 12/2022 | Li | ................... | C08F 216/06 |
| 2022/0403147 A1* | 12/2022 | Liang | ................... | B32B 27/306 |
| 2022/0403212 A1* | 12/2022 | Liang | ................... | C09J 7/29 |
| 2023/0382089 A1* | 11/2023 | Shimo | ................... | B65D 65/40 |
| 2024/0279454 A1* | 8/2024 | Liang | ................... | B32B 27/304 |
| 2024/0309185 A1* | 9/2024 | Liang | ................... | B32B 27/34 |

FOREIGN PATENT DOCUMENTS

| | | |
|---|---|---|
| CN | 113024936 A | 6/2021 |
| JP | H11-294947 A | 10/1999 |
| JP | 2002-293948 A | 10/2002 |
| JP | 2005-068324 A | 3/2005 |
| JP | 2021-084855 A | 6/2021 |
| TW | 1767756 B | 6/2022 |

* cited by examiner

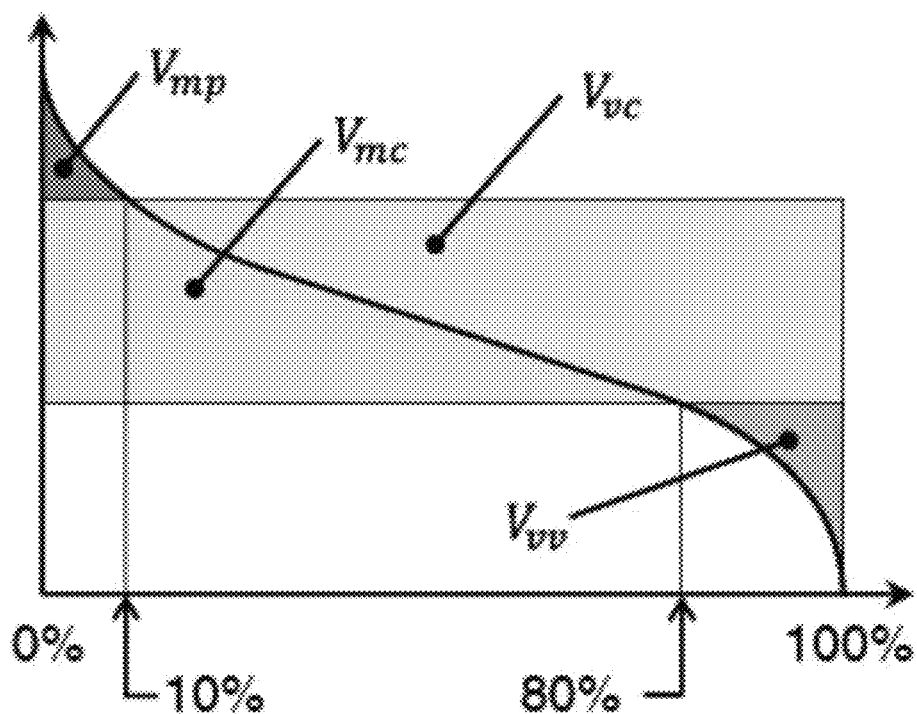

ETHYLENE-VINYL ALCOHOL COPOLYMER RESIN PARTICLE COMPOSITION, ETHYLENE-VINYL ALCOHOL COPOLYMER FILM FORMED THEREFROM, AND MULTILAYER STRUCTURE

BACKGROUND OF THE INVENTION

1. Technical Field

The present disclosure relates to an ethylene-vinyl alcohol copolymer (EVOH) composition, and more particularly to an ethylene-vinyl alcohol copolymer (EVOH) resin particle composition, a film and multilayer structure formed from the EVOH resin particle composition.

2. Description of Related Art

Existing EVOH resin is widely applied to multilayer substances to preserve perishable goods. For instance, EVOH resin and multilayer substances made therefrom are commonly used in the food packaging industry, medical equipment and consumables industry, pharmaceutical manufacturing industry, electronics industry and agricultural chemical industry. In general, EVOH resin is usually provided in the form of thin-film and, for example, incorporated into multilayer substances to function as a unique layer, i.e., an oxygen blocking layer.

In practice, the manufacturing sector has to meet requirements in various dimensions, such as the workability, mechanical properties, and heat resistance, of thin-films made of EVOH. For example, an EVOH thin-film thus made will be deemed excellently workable if its surface is free of plenty gel particles (commonly known as "fish eyes"). Moreover, an EVOH thin-film thus made will be regarded as having ideal mechanical properties if the EVOH thin-film has a satisfactory stretching rate in the course of film stretching under a specific tensile force.

BRIEF SUMMARY OF THE INVENTION

However, the prior art has never disclosed a concept or means of effectively meeting the aforesaid requirements. The inventor of the disclosure conducted research on the aforesaid technical issue and discovered that a thin-film formed from an EVOH resin particle composition comprising two EVOH resin particles each having a specific range of surface peak material volume (Vmp) values exhibits satisfactory workability and mechanical properties.

Therefore, the disclosure in one aspect provides an ethylene-vinyl alcohol copolymer (EVOH) resin particle composition, comprising: a first EVOH resin particle having a surface peak material volume (Vmp) of $0.00001~6$ $\mu m^3/\mu m^2$; and a second EVOH resin particle having a surface peak material volume (Vmp) of $0.00015~20$ $\mu m^3/\mu m^2$.

According to some embodiments of the disclosure, the second EVOH resin particle has a greater Vmp than the first EVOH resin particle.

According to some embodiments of the disclosure, the first EVOH resin particle has a melting point of 135~179° C., and the second EVOH resin particle has a melting point of 180~198° C.

According to some embodiments of the disclosure, the first EVOH resin particle has an ethylene content of 36~50 mole %.

According to some embodiments of the disclosure, the second EVOH resin particle has an ethylene content of 20~35 mole %.

According to some embodiments of the disclosure, the EVOH resin particle is cylindrical, elliptic cylindrical, prismoidal, spherical, ellipsoidal or biconvex-disk-shaped and has a major axis or height of 1~5 mm and a minor axis of 1~5 mm.

According to some embodiments of the disclosure, the EVOH resin particle composition has a ratio of the first EVOH resin particle to the second EVOH resin particle by weight percentage ranges from 5:95 to 75:25.

According to some embodiments of the disclosure, the EVOH resin particle composition has a boron content of 5~550 ppm.

According to some embodiments of the disclosure, the EVOH resin particle composition has an alkali metal content of 10~550 ppm.

According to some embodiments of the disclosure, the first EVOH resin particle has a kurtosis (Sku) surface parameter of 0.0020~25, and the second EVOH resin particle has a kurtosis (Sku) surface parameter of 0.0070~111.

According to some embodiments of the disclosure, the first EVOH resin particle has a maximum peak height (Sp) surface parameter of 0.0005~29 μm, and the second EVOH resin particle has a maximum peak height (Sp) surface parameter of 0.0020~63 μm.

According to some embodiments of the disclosure, the first EVOH resin particle has a protruding peak portion height (Spk) surface parameter of 0.001~2 μm, and the second EVOH resin particle has a protruding peak portion height (Spk) surface parameter of 0.003~22 μm.

According to some embodiments of the disclosure, the first EVOH resin particle has a peak extreme height (Sxp) surface parameter of 0.001~12 μm, and the second EVOH resin particle has a peak extreme height (Sxp) surface parameter of 0.002~48 μm.

According to some embodiments of the disclosure, the first EVOH resin particle has a linear arithmetic mean height (Ra) surface parameter of 0.001~0.990 μm, and the second EVOH resin particle has a linear arithmetic mean height (Ra) surface parameter of 0.001~0.990 μm.

According to some embodiments of the disclosure, the first EVOH resin particle has a linear maximum height (Rz) surface parameter of 0.001~9.900 μm, and the second EVOH resin particle has a linear maximum height (Rz) surface parameter of 0.001~9.900 μm.

The disclosure in another aspect provides an ethylene-vinyl alcohol copolymer film formed from the EVOH resin particle composition.

The disclosure in yet another aspect provides a multilayer structure, comprising: (a) at least one layer of the ethylene-vinyl alcohol copolymer film formed from the EVOH resin particle composition; (b) at least one layer of a polymer layer; and (c) at least one layer of a binding layer.

According to some embodiments of the disclosure, the polymer layer is one selected from the group consisting of a low-density polyethylene layer, polyethylene grafted maleic anhydride layer, polypropylene layer and nylon layer, and the binding layer is a tie layer.

According to some embodiments of the disclosure, the multilayer structure is a polymer layer/binding layer/ethylene-vinyl alcohol copolymer film/binding layer/polymer layer.

An ethylene-vinyl alcohol copolymer (EVOH) resin particle composition, an EVOH film formed therefrom, and a multilayer structure containing the film, as provided by the disclosure, enable thin-films formed from the EVOH resin particle composition to exhibit satisfactory workability and mechanical properties in the absence of any limitations imposed by a specific theory.

BRIEF DESCRIPTION OF THE SEVERAL VIEWS OF THE DRAWINGS

The disclosure is illustrated by embodiments and depicted with an accompanying diagram briefly described as follows:

The sole FIGURE is a schematic view of the disclosure according to an applicable surface peak material volume.

It is noteworthy that the accompanying diagram is not restrictive of various aspect of the disclosure in terms of arrangements, means and features.

DETAILED DESCRIPTION OF THE INVENTION

The disclosure in one aspect provides an ethylene-vinyl alcohol copolymer (EVOH) resin particle composition, comprising: a first EVOH resin particle having a surface peak material volume (Vmp) of 0.00001~6 $\mu m^3/\mu m^2$, and a second EVOH resin particle having a surface peak material volume (Vmp) of 0.00015~20 $\mu m^3/\mu m^2$.

The term "surface peak material volume (Vmp)" used herein refers to the physical volume of bearing area ratio p % and is defined by ISO 25178. It is also feasible to quantify a core portion, protruding peak portion, size of protruding trough portion with volume parameters. As shown in the sole FIGURE, Vmp denotes the volume of the protruding peak portion, Vmc denotes the volume of the core portion, Vvc denotes the capacity of the core portion space, and Vvv denotes the bearing area ratio of the protruding trough portion. In the sole FIGURE, for example, the range 10% to 80% is specified to be the interval of the core portion. The first EVOH resin particle has a Vmp of 0.00001~6 $\mu m^3/\mu m^2$, for example, 0.00001, 0.00005, 0.00100, 0.00200, 0.00500, 0.01000, 0.05000, 0.10000, 0.50000, 1, 2, 3, 4, 5, or 6 $\mu m^3/\mu m^2$. The second EVOH resin particle has a Vmp of 0.00015~20 $\mu m^3/\mu m^2$, for example, 0.00015, 0.00050, 0.01000, 0.05000, 0.10000, 0.50000, 1, 5, 10, 15 or 20 $\mu m^3/\mu m^2$. In a preferred embodiment of the disclosure, the second EVOH resin particle has a greater Vmp than the first EVOH resin particle.

According to some embodiments of the disclosure, the first EVOH resin particle has a melting point of 135~179° C., for example, 135, 140, 145, 150, 155, 160, 165, 170, 175 or 179° C. In another aspect, the second EVOH resin particle has a melting point of 180~198° C., for example, 180, 182, 184, 186, 188, 190, 192, 194, 196 or 198° C.

According to some embodiments of the disclosure, the first EVOH resin particle has an ethylene content of around 36~50 mole %, for example, 36, 38, 40, 42, 44, 46, 48 or 50 mole %. In another aspect, the second EVOH resin particle has an ethylene content of 20~35 mole %, for example, 20, 21, 23, 25, 27, 29, 31, 33 or 35 mole %.

Furthermore/alternatively, the EVOH has a saponification degree of 90 mole % or higher, preferably 95 mole % or higher, preferably 97 mole % or higher, and preferably 99.5 mole % or higher.

The expression "the EVOH particle" used herein implies the form and/or shape of one or more particles formed when the EVOH resin undergoes pelletization; although the formation of one or more EVOH particles by pelletization is expressly described herein, the EVOH particle can be processed to take on the shape of a bead, a cube, a fragment, a shaving or the like according to the disclosure. According to some embodiments of the disclosure, the EVOH resin particle is cylindrical, elliptic cylindrical, prismoidal, spherical, ellipsoidal or biconvex-disk-shaped (corresponding to go-shape) in shape and has a major axis/height of 1~5 mm, for example, 1, 2, 3, 4 or 5 mm, and a minor axis of 1~5 mm, for example, 1, 2, 3, 4 or 5 mm. The term "major axis/height" used herein means the longest outer diameter of an object whose surface is defined by a closed curved surface. The "minor axis" is perpendicular to the "major axis/height" and means the shortest diameter of a cross section with the maximum area. The aforesaid expression "an object whose surface is defined by a closed curved surface" can be regarded as an object whose surface is integrally formed of a curved surface, an object being defined by multiple mutually-crossing surfaces and thus having no corners, or an object having no rectangular cross sections wherever they are.

When the EVOH resin particle is cylindrical or elliptic cylindrical, its height falls within the range of 1~5 mm, for example, 1.5~5.0 mm, 1.7~5.0 mm, 2.2~5.0 mm, 2.4~5.0 mm, 2.6~5.0 mm, 2.8~5.0 mm, 3.0~5.0 mm, 3.2~5.0 mm, 3.4~5.0 mm, 3.6~5.0 mm, 3.8~5.0 mm, 4.0~5.0 mm, 1.7~4.5 mm, 1.7~4.4 mm, 1.7~4.2 mm, 1.7~4.0 mm, 1.7~3.8 mm, 1.7~3.6 mm, 1.7~3.4 mm, 1.7~3.2 mm, or 1.7~3.0 mm, and its minor axis falls within the range of 1~5 mm, for example, 1.5~5.0 mm, 1.7~5.0 mm, 2.2~5.0 mm, 2.4~5.0 mm, 2.6~5.0 mm, 2.8~5.0 mm, 3.0~5.0 mm, 3.2~5.0 mm, 3.4~5.0 mm, 3.6~5.0 mm, 3.8~5.0 mm, 4.0~5.0 mm, 1.7~4.5 mm, 1.7~4.4 mm, 1.7~4.2 mm, 1.7~4.0 mm, 1.7~3.8 mm, 1.7~3.6 mm, 1.7~3.4 mm, 1.7~3.2 mm, or 1.7~3.0 mm.

When the EVOH particle is spherical, ellipsoidal or biconvex-disk-shaped, its major axis falls within the range of 1~5 mm, for example, 1.5~5.0 mm, 2.2~5.0 mm, 2.4~5.0 mm, 2.6~5.0 mm, 2.8~5.0 mm, 3.0~5.0 mm, 3.2~5.0 mm, 3.4~5.0 mm, 3.6~5.0 mm, 3.8~5.0 mm, 4.0~5.0 mm, 2.0~4.5 mm, 2.0~4.4 mm, 2.0~4.2 mm, 2.0~4.0 mm, 2.0~3.8 mm, 2.0~3.6 mm, 2.0~3.4 mm, 2.0~3.2 mm, or 2.0~3.0 mm, and its minor axis falls within the range of 1~5 mm, for example, 1.5~5.0 mm, 1.8~4.6 mm, 2.4~4.6 mm, 2.6~4.6 mm, 2.8~4.6 mm, 3.0~4.6 mm, 3.2~4.6 mm, 3.4~4.6 mm, 3.6~4.6 mm, 3.8~4.6 mm, 4.0~4.6 mm, 1.6~4.5 mm, 1.6~4.4 mm, 1.6~4.2 mm, 1.6~4.0 mm, 1.6~3.8 mm, 1.6~3.6 mm, 1.6~3.4 mm, 1.6~3.2 mm, or 1.6~3.0 mm. When the EVOH particle is spherical, its major axis and minor axis are of equal length.

According to some embodiments of the disclosure, the ratio of the first EVOH resin particle to the second EVOH resin particle by weight percentage ranges from 5:95 to 75:25 and is, for example, 5:95, 15:85, 25:75, 35:65, 45:55, 55:45, 65:35 or 75:25.

According to some embodiments of the disclosure, in some situations the EVOH resin particle composition comprises boron compound and/or boric acid and/or cinnamic acid and/or alkali metal and/or conjugated polyene and/or lubricant and/or alkaline earth metal. The substances improve the properties of the EVOH resin particle composition.

According to some embodiments of the disclosure, the EVOH resin particle composition comprises a boron compound with a boron content of 5 to 550 ppm. In some situations, the boron content of the EVOH resin particle composition depends on the total weight of the EVOH resin particle composition which falls within the range of 10 to 450 ppm, 10 to around 400 ppm, 10 to around 350 ppm, 10 to around 300 ppm, 10 to around 275 ppm, 10 to around 250 ppm, 10 to around 225 ppm, 10 to around 200 ppm, 10 to around 175 ppm, around 20 to 450 ppm, around 20 to around 400 ppm, around 20 to around 350 ppm, around 20 to around 300 ppm, around 20 to around 275 ppm, around 20 to around 250 ppm, around 20 to around 225 ppm, around 20 to around 200 ppm, around 20 to around 175 ppm, around 60 to 450 ppm, around 60 to around 400 ppm, around 60 to around 350 ppm, around 60 to around 300 ppm, around 60 to around 275 ppm, around 60 to around 250 ppm, around 60 to around 225 ppm, around 60 to around 200 ppm, around 60 to around 175 ppm, around 100 to 450 ppm, around 100 to around 400 ppm, around 100 to around 350 ppm, around 100 to around 300 ppm, around 100 to around 275 ppm, around 100 to around 250 ppm, around 100 to around 225 ppm, around 100 to around 200 ppm, around 100 to around 175 ppm, around 140 to 450 ppm, around 140 to around 400 ppm, around 140 to around 350 ppm, around 140 to around 300 ppm, around 140 to around 275 ppm, around 140 to around 250 ppm, around 140 to around 225 ppm, around 140 to around 200 ppm, around 180 to around 450 ppm, around 180 to around 400 ppm, around 180 to around 350 ppm, around 180 to around 300 ppm, around 180 to around 275 ppm, around 180 to around 250 ppm, around 180 to around 225 ppm, around 220 to 450 ppm, around 220 to around 400 ppm, around 220 to around 350 ppm, around 220 to around 300 ppm, or around 220 to around 275 ppm. When the boron content of the EVOH resin particle composition falls within a specific range, it enhances the binding adhesiveness of the EVOH resin particle composition and reduces the chance that the EVOH resin particle composition will adhere to a screw, or removes the EVOH from the screw, to thereby attain the self-cleansing capability of materials, further improving film thickness uniformity. In a preferred embodiment of the disclosure, in addition to a boron compound, the EVOH resin particle composition further comprises cinnamic acid, alkali metal, conjugated polyene, alkaline earth metal, a salt thereof and/or a mixture thereof. The substances are commonly found in EVOH resin particle compositions to enhance the properties thereof. When the aforesaid compounds with a conjugated polyene structure each account for 1~30000 ppm of the EVOH resin particle composition of a unit weight, they further inhibit after-heating coloring to thereby enhance thermal stability. If each unit weight of the EVOH resin composition comprises 10~550 ppm (calculated by metal conversion) of the alkali metal compound or alkaline earth metal compound, operation can last longer to enhance the formation process. The aforesaid concentration/content falls within any one of the following ranges as needed: 10~550 ppm, around 10~500 ppm, around 10~450 ppm, around 10~400 ppm, around 10~350 ppm, around 10~300 ppm, around 10~250 ppm, around 10~200 ppm, around 10~150 ppm, around 10~100 ppm, around 10~50 ppm, around 50~550 ppm, around 50~500 ppm, around 50~450 ppm, around 50~400 ppm, around 50~350 ppm, around 50~300 ppm, around 50~250 ppm, around 50~200 ppm, around 50~150 ppm, around 50~100 ppm, around 100~550 ppm, around 100~500 ppm, around 100~450 ppm, around 100~400 ppm, around 100~350 ppm, around 100~300 ppm, around 100~250 ppm, around 100~200 ppm, around 100~150 ppm, around 200~550 ppm, around 200~500 ppm, around 200~450 ppm, around 200~400 ppm, around 200~350 ppm, around 200~300 ppm, around 200~250 ppm, around 300~550 ppm, around 300~500 ppm, around 300~450 ppm, around 300~400 ppm, around 300~350 ppm, around 400~550 ppm, around 400~500 ppm, around 400~450 ppm, and around 500~550 ppm.

According to some embodiments of the disclosure, the boron compound includes boric acid or its metal salts. Examples of the metal salts include but are not limited to calcium borate, cobalt borate, zinc borate (for example, zinc tetraborate, zinc metaborate), potassium aluminum borate, ammonium borate (for example, ammonium metaborate, ammonium tetraborate, ammonium pentaborate, ammonium octaborate), cadmium borate (for example, cadmium orthoborate, cadmium tetraborate), potassium borate (for example, potassium metaborate, potassium tetraborate, potassium pentaborate, potassium hexaborate, potassium octaborate), silver borate (for example, silver metaborate, silver tetraborate), copper borate (for example, copper (II) borate, copper metaborate, copper tetraborate), sodium borate (for example, sodium metaborate, sodium diborate, sodium tetraborate, sodium pentaborate, sodium hexaborate, sodium octaborate), lead borate (for example, lead metaborate, lead hexaborate), nickel borate (for example, nickel orthoborate, nickel diborate, nickel tetraborate, nickel octaborate borate), barium borate (for example, barium orthoborate, barium metaborate, barium diborate, barium tetraborate), bismuth borate, magnesium borate (for example, magnesium orthoborate, magnesium diborate, magnesium metaborate, trimagnesium tetraborate, pentamagnesium tetraborate), manganese borate (for example, manganese (I) borate, manganese metaborate, manganese tetraborate), lithium borate (for example, lithium metaborate, lithium tetraborate, lithium pentaborate), a salt thereof or a combination thereof. It includes borate minerals, such as borax, kainite, inyoite, kotoite, szaibelyite/suanite, and szaibelyite. Preferably, it includes borax, boric acid and sodium borate (for example, sodium metaborate, sodium diborate, sodium tetraborate, sodium pentaborate, sodium hexaborate and sodium octaborate).

According to some embodiments of the disclosure, the first EVOH resin particle has a kurtosis (Sku) surface parameter of 0.0020~25, for example, around 0.0100~25, around 0.1000~25, around 1~25, around 1~23.3000, around 1~20, around 1~15, around 5~15 or around 7~10. In another aspect, the second EVOH resin particle has a kurtosis (Sku) surface parameter of 0.0070~111, for example, around 0.0100~111, 0.0200~100, around 0.2000~65, around 2~50, around 2~40, around 10~40 or around 20~40.

Please refer to ISO 25178:2012 for the definition of the term "kurtosis (Sku) surface parameter" used herein, it can be regarded as the distribution of the height of the surface of an outline within a sampling range and serves as a parameter for determining the sharpness of a surface shape.

According to some embodiments of the disclosure, the first EVOH resin particle has a maximum peak height (Sp) surface parameter of 0.0005~29 μm, for example, around 0.0005~28 μm, around 0.0010~25 μm, around 0.0100~25 μm, around 0.1000~25 μm, around 1~25 μm, around 1~20 μm, around 1~15 μm, around 5~15 μm or around 7~10 μm. In another aspect, the second EVOH resin particle has a maximum peak height (Sp) surface parameter of 0.0020~63 μm, for example, around 0.0020~60 μm, around 0.0200~60 μm, around 0.2000~60 μm, around 2~60 μm, around 10~60 μm, around 20~50 μm, around 25~40 μm, around 30~40 μm or around 30~36 μm.

Please refer to ISO 25178:2012 for the definition of the term "maximum peak height (Sp) surface parameter" used herein, it can be regarded as the maximum height value relative to a standard surface within a sampling range.

According to some embodiments of the disclosure, the first EVOH resin particle has a protruding peak portion height (Spk) surface parameter of 0.001~2 μm, for example, around 0.001~2 μm, around 0.005~2 μm, around 0.010~2 μm, around 0.050~2 μm, around 0.100~2 μm, around 0.100~1 μm or around 0.500~1 μm. In another aspect, the second EVOH resin particle has a protruding peak portion height (Spk) surface parameter of 0.003~22 μm, for example, around 0.003~20 μm, around 0.030~20 μm, around 0.300~20 μm, around 1~20 μm, around 5~20 μm, around 5~15 μm or around 5~10 μm.

Please refer to ISO 25178:2012 for the definition of the term "protruding peak portion height (Spk) surface parameter" used herein, it means the average height of the protruding peak portion.

According to some embodiments of the disclosure, the first EVOH resin particle has a peak extreme height (Sxp) surface parameter of 0.001~12 μm, for example, around 0.001~11 μm, around 0.005~10 μm, around 0.010~2 μm, around 0.050~2 μm, around 0.100~2 μm, around 0.100~1 μm or around 0.500~1 μm. In another aspect, the second EVOH resin particle has a peak extreme height (Sxp surface parameter of 0.002~48 μm, for example, around 0.003~48 μm, around 0.030~30 μm, around 0.300~20 μm, around 1~20 μm, around 5~20 μm, around 5~15 μm or around 5~10 μm.

Please refer to ISO 25178:2012 for the definition of the term "peak extreme height (Sxp) surface parameter" used herein, it means a height difference between an average of a surface and the peak of the surface after the removal of the highest peak of the surface. The default Sxp value is the height difference between bearing area ratio 2.5% and 50%.

According to some embodiments of the disclosure, the first EVOH resin particle has a linear arithmetic mean height (Ra) surface parameter of 0.001~0.990 μm, for example, falling within the range of around 0.001~0.990 μm, around 0.001~0.700 μm, around 0.001~0.500 μm, around 0.001~0.300 μm, around 0.001~0.100 μm, around 0.050~0.990 μm, around 0.050~0.700 μm, around 0.050~0.500 μm, around 0.050~0.300 μm or around 0.050~0.100 μm. In another aspect, the second EVOH resin particle has a linear arithmetic mean height (Ra) surface parameter of 0.001~0.990 μm, for example, falling within the range of around 0.001~0.990 μm, around 0.001~0.700 μm, around 0.001~0.500 μm, around 0.010~0.300 μm, around 0.010~0.100 μm, around 0.050~0.990 μm, around 0.050~0.700 μm, around 0.050~0.500 μm, around 0.050~0.300 μm or around 0.050~0.100 μm.

Please refer to JIS B 0601 for the definition of the term "linear arithmetic mean height (Ra) surface parameter" used herein, it is a parameter for defining surface roughness and can be regarded as the average absolute value of an outline curve on a standard length.

According to some embodiments of the disclosure, the first EVOH resin particle has a linear maximum height (Rz) surface parameter of 0.0010~9.9000 μm, for example, falling within the range of around 0.0010~9 μm, around 0.0010~7 μm, around 0.0010~5 μm, around 0.0100~3 μm, around 0.0500~5 μm, around 0.0500~3 μm, around 0.0500~1 μm or around 0.0500~0.0800 μm. In another aspect, the second EVOH resin particle has a linear maximum height (Rz) surface parameter of 0.0010~9.9000 μm, for example, falling within the range of around 0.0800~9 μm, around 0.1000~9 μm, around 0.1500~9 μm, around 0.1500~7 μm, around 0.5000~5 μm, around 0.5000~2.5000 μm or around 1~2.5000 μm. The term "linear maximum height (Rz) surface parameter" used herein is a parameter for defining surface roughness and is defined by JIS B 0601; it can be regarded as the distance between the highest peak and the lowest trough of an outline curve relative to a standard length.

In another aspect, the disclosure provides an ethylene-vinyl alcohol copolymer film formed from the EVOH resin particle composition. Specifically speaking, the ethylene-vinyl alcohol copolymer film is a single-layer thin-film.

In yet another aspect, the disclosure provides a multilayer structure, comprising: (a) at least one layer of the ethylene-vinyl alcohol copolymer film formed from the EVOH resin particle composition; (b) at least one layer of a polymer layer; and (c) at least one layer of a binding layer.

According to some embodiments of the disclosure, the polymer layer is one selected from the group consisting of a low-density polyethylene layer, polyethylene grafted maleic anhydride layer, polypropylene layer and nylon layer, and the binding layer is a tie layer, for example, ARKEMA OREVAC 18729 manufactured by ARKEMA. Specifically speaking, the layers of the multilayer structure are arranged in the following order: a polymer layer, binding layer, ethylene-vinyl alcohol copolymer film, binding layer and polymer layer. According to some embodiments of the disclosure, the polymer layer has a thickness of 100~500 μm, preferably 200~400 μm, more preferably 300 μm, the binding layer has a thickness of 10~40 μm, preferably 20~30 μm, more preferably 25 μm, and the ethylene-vinyl alcohol copolymer film has a thickness of 20~80 μm, preferably 40~60 μm, more preferably 50 μm.

In the absence of any limitations imposed by any theory, the surface peak material volume (Vmp) is the main factor in heat conduction at the tip and thus relates to melting that occurs in the course of material processing to thereby further affect the heat conduction uniformity in the course of processing the first EVOH resin particle and the second EVOH resin particle. Thus, when the Vmp values of the first EVOH resin particle and the second EVOH resin particle of the EVOH resin particle composition fall within a specific range, the EVOH with a high melting point has a high peak surface roughness to thereby cause the peak portion to melt first in the course of processing and render resin particle heat conduction uniform so as to shift its melting zone temperature forward, whereas the EVOH with a low melting point has a low peak surface roughness to thereby reduce the chance of local overheat of the peak portion in the course of processing. Therefore, the surface peak material volume (Vmp) of the two EVOH resin particles is controlled to regulate the heat conduction condition upon completion of melting and mixing to ensure uniform melting, so as to obtain an EVOH thin-film with satisfactory workability and mechanical properties.

Embodiment

Nonrestrictive embodiments for all aspects of the disclosure are provided below to describe all the aspects of the disclosure and the advantages they achieve. The EVOH formula of each example and each comparative example comprises at least two ingredients. The two ingredients of the EVOH resin particle composition of each example and each comparative example are two types of EVOH resin particles.

Preparation of EVOH Resin Particle Composition

A nonrestrictive preparation method for the EVOH resin particle composition is provided and described below. According to a method similar to the method disclosed below, five EVOH resin particle compositions of nonrestrictive embodiments (examples EVOH 1-5) and six EVOH resin particle compositions of comparative examples (comparative examples EVOH 1-6) are prepared. However, a specific method of preparing examples EVOH 1-5 and comparative examples EVOH 1-6 is usually different from the method disclosed below in one or more aspects.

First EVOH Resin Particle in Example 1

500 kg of vinyl acetate, 100 kg of methanol, 0.0585 kg of acetyl peroxide, and 0.015 kg of citric acid are introduced into a polymerizer with cooling coils. Then, the polymerizer is temporarily filled with nitrogen gas. Next, ethylene is introduced and compressed until the ethylene pressure reaches 45 kg/cm$^2$. In the ethylene-pressurized environment, the mixture in the polymerizer is stirred and heated up to 67° C. to start polymerization. After the polymerization has been occurring for six hours, 0.0525 kg of conjugated polyene sorbate functioning as a polymerization inhibitor is added into the polymerizer as soon as the polymerization rate reaches 60%. Thus, an ethylene-vinyl acetate copolymer with a content of 44 mole % of ethylene structural units is obtained. After that, a reaction solution that contains ethylene-vinyl acetate copolymer is supplied to a distillation column, and methanol vapor is introduced into the distillation column via the lower portion thereof to eliminate unreacted vinyl acetate, so as to obtain a methanol solution of ethylene-vinyl acetate copolymer.

In this example, ethylene-vinyl acetate copolymer (hereinafter referred to as "EVAC" polymer) formed by the polymerization of ethylene monomer and vinyl acetate monomer undergoes saponification at a saponification degree of 99.5% to form EVOH. Then, EVOH is dissolved in an aqueous solution of alcohol with a methanol-to-water ratio of 70:30. The solution of EVOH/methanol/water is left to stand still at 60° C. for 1 hour to promote the dissolution of EVOH in the solution of EVOH/methanol/water. The solution of EVOH/methanol/water has a solid content of 41 wt %.

Then, the solution of methanol, water and EVOH undergoes pelletization by strip cutting. Specifically speaking, with a pump, the solution of methanol, water and EVOH is delivered to a feeding pipe at a flow rate of 120 L/min and then introduced into an opening portion mold with a round shape and a diameter of 0.5 mm to squeeze the EVOH solution into a water/methanol mixture solution (with a water/methanol quality ratio of 9/1) having a temperature of 5° C., being thread-shaped at a precipitation outlet and being severed by a rotating knife with a rotation speed of 500 rpm, so as to produce EVOH particles. Then, the EVOH particles undergo centrifugation to release EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The drying step is performed in three phases. The first phase of drying uses a belt dryer in carrying out drying at 80° C. for 2 hours. The second phase of drying uses a belt dryer in carrying out drying at 100° C. for 20 hours. The third phase of drying uses a fluid dryer in carrying out drying at 120° C. for 20 hours. Finally, the particles are delivered. The aforesaid delivery occurs in the condition as follows: air-based delivery, a pipeline diameter of 6 inches, four bends, a pipeline length of 30 m, and a delivery speed of 40 m/min. In this example, the first EVOH resin particle is cylindrical with a height of 5 mm and a minor axis of 1 mm.

The centrifugation and rinsing step is carried out at a dehydrator rotation speed of 5000 rpm in the first instance, at a water to wet particle ratio of 10 during delivery, with an open-style delivery-dedicated centrifugal pump, at a delivery pump rotation speed of 3000 rpm, at a water to wet particle weight ratio of 5 during rinsing, and at a water flow speed of 2 m/min during rinsing. However, the dehydrator rotation speed is 2000 rpm in the second instance.

Second EVOH Resin Particle of Example 1

The second EVOH resin particle of example 1 is prepared with a method similar to the method described above. The differences of the method for preparing the second EVOH resin particle of example 1 are as follows: performing saponification at a saponification degree of 99.5% on an ethylene-vinyl acetate copolymer (hereinafter referred to as "EVAC") with an ethylene content of 32 mole % to prepare an EVOH polymer, using a strip-cutting opening mold with a diameter of 2 mm and a rotating knife with a rotation speed of 2000 rpm.

The centrifugation and rinsing step is performed on the second EVOH resin particle in this example at the first-instance dehydrator rotation speed of 3000 rpm, at a water to wet particle ratio of 3 during delivery, with an open-style delivery-dedicated centrifugal pump, at a delivery pump rotation speed of 2000 rpm, at a water to wet particle weight ratio of 3 during rinsing, and at a water flow speed of 2.5 m/min during water rinsing. The second-instance dehydrator rotation speed is 3000 rpm. In this example, the end product of the second EVOH resin particle is cylindrical and has a height of 2 mm and a minor axis of 3 mm.

For the purpose of carrying out a preparation process later, the first EVOH resin particle and the second EVOH resin particle are further mixed at a ratio by weight percentage of 25:75 wt %, with a conical screw mixer (Model No.: CM-2, purchased from She Hui Machinery Co., Ltd.), at a rotation speed of 10 rpm for 5 minutes continuously, so as to prepare the EVOH resin particle composition of example 1.

First and Second EVOH Resin Particles of Example 2

First and second EVOH methanol aqueous solutions for use in example 2 are prepared with a preparation process similar to that for preparing the EVOH resin particles of example 1. However, the preparation of the first EVOH methanol aqueous solution of embodiment 2 has the differences as follows: an ethylene content of 48 mole %, and the pelletization step that entails performing pelletization on the solution of methanol, water and EVOH through underwater pelletization. Specifically speaking, with a pump, the solution of methanol, water and EVOH is delivered into a feeding pipe at a flow rate of 120 L/min and then delivered into an input pipe with a diameter of 1 mm before being severed by a rotating knife with a rotation speed of 1500 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. In this embodiment, the first EVOH resin particle is ellipsoidal and has a major axis of 3 mm and a minor axis of 2 mm.

The centrifugation and rinsing step is performed at a first-instance dehydrator rotation speed of 3000 rpm, at a water to wet particle ratio of 10 during delivery, with a semi-open-style delivery-dedicated centrifugal pump, at a delivery pump rotation speed of 4000 rpm, at a water to wet particle weight ratio of 10 during rinsing, and at a water flow speed of 2 m/min during water rinsing. The second-instance dehydrator rotation speed is 1000 rpm. Finally, the end product of the first EVOH resin particle is ellipsoidal and has a major axis of 3 mm and a minor axis of 2 mm.

In another aspect, the preparation of the second EVOH methanol aqueous solution of examples 2 has the differences as follows: an ethylene content of 27 mole %, a preparation process similar to that for preparing the first EVOH resin particle of example 2, and an input pipe is with a diameter of 2 mm. The centrifugation and rinsing step is performed at a first-instance dehydrator rotation speed of 2000 rpm, at a water to wet particle ratio of 5 during delivery, with a closed-style delivery-dedicated centrifugal pump, at a delivery pump rotation speed of 1000 rpm, at a water to wet particle weight ratio of 10 during rinsing, and at a water flow speed of 5 m/min during water rinsing. The second-instance dehydrator rotation speed is 3000 rpm. Finally, the end product of the second EVOH resin particle is spherical and has a minor axis of 3 mm. Furthermore, the first EVOH resin particle and second EVOH resin particle are further mixed at a ratio by weight percentage of 10:90 wt % to prepare the EVOH resin particle composition of example 2.

First and Second EVOH Resin Particles of Example 3

The first EVOH methanol aqueous solution for use in embodiment 3 are prepared with a preparation process similar to that for preparing the EVOH resin particles of example 2. However, when the first EVOH methanol aqueous solution of example 3 is prepared, its ethylene content is of 38 mole %, and a preparation process is similar to that for preparing the first EVOH resin particle of example 2, an input pipe is with a diameter of 0.5 mm, and a rotating knife is with a rotation speed of 3000 rpm. The centrifugation and rinsing step is performed at a first-instance dehydrator rotation speed of 2500 rpm, at a water to wet particle ratio of 8 during delivery, with an open-style delivery-dedicated centrifugal pump, at a delivery pump rotation speed of 5000 rpm, at a water to wet particle weight ratio of 8 during rinsing, and at a water flow speed of 2.5 m/min during water rinsing. The second-instance dehydrator rotation speed is 3000 rpm. Finally, the end product of the first EVOH resin particle is spherical and has a minor axis of 1 mm.

In another aspect, the preparation of the second EVOH methanol aqueous solution of example 3 with a preparation process similar to that for preparing the EVOH resin particles of example 1 has the differences as follows: an ethylene content of 29 mole %, a strip-cutting opening mold with a diameter of 4 mm, and a rotating knife with a rotation speed of 3000 rpm. The centrifugation and rinsing step is performed at a first-instance dehydrator rotation speed of 1000 rpm, at a water to wet particle ratio of 5 during delivery, with a semi-open-style delivery-dedicated centrifugal pump, at a delivery pump rotation speed of 5000 rpm, at a water to wet particle weight ratio of 5 during rinsing, and at a water flow speed of 5 m/min during water rinsing. The second-instance dehydrator rotation speed is 4000 rpm. Finally, the end product of the second EVOH resin particle is cylindrical and has a height of 1 mm and a minor axis of 5 mm. Furthermore, the first EVOH resin particle and second EVOH resin particle are further mixed at a ratio by weight percentage of 50:50 wt % to prepare the EVOH resin particle composition of example 3.

First and Second EVOH Resin Particles of Example 4

The first EVOH resin particle for use in example 4 are prepared with a preparation process similar to that for preparing the EVOH resin particles of example 2. However, the preparation of the first EVOH methanol aqueous solution of embodiment 4 has the differences as follows: an ethylene content of 48 mole %, an input pipe with a diameter of 0.5 mm, and a rotating knife with a rotation speed of 500 rpm. The centrifugation and rinsing step is performed at a first-instance dehydrator rotation speed of 2500 rpm, at a water to wet particle ratio of 6 during delivery, with a semi-open-style delivery-dedicated centrifugal pump, at a delivery pump rotation speed of 5000 rpm, at a water to wet particle weight ratio of 7 during rinsing, and at a water flow speed of 2 m/min during water rinsing. The second-instance dehydrator rotation speed is 4000 rpm. Finally, the end product of the first EVOH resin particle is ellipsoidal and has a major axis of 5 mm and a minor axis of 1 mm.

In another aspect, the preparation of the second EVOH methanol aqueous solution of example 4 with a preparation process similar to that for preparing the EVOH resin particles of example 1 has the differences as follows: an ethylene content of 32 mole %, a strip-cutting opening mold with a diameter of 2 mm, and a rotating knife with a rotation speed of 1500 rpm. The centrifugation and rinsing step is performed at a first-instance dehydrator rotation speed of 3000 rpm, at a water to wet particle ratio of 9 during delivery, with an open-style delivery-dedicated centrifugal pump, at a delivery pump rotation speed of 4000 rpm, at a water to wet particle weight ratio of 10 during rinsing, and at a water flow speed of 5 m/min during water rinsing. The second-instance dehydrator rotation speed is 4000 rpm. Finally, the end product of the second EVOH resin particle is cylindrical and has a height of 3 mm and a minor axis of 3 mm. Furthermore, the first EVOH resin particle and second EVOH resin particle are further mixed at a ratio by weight percentage of 15:85 wt % to prepare the EVOH resin particle composition of example 4.

First and Second EVOH Resin Particles of Example 5

First and second EVOH resin particles for use in example 5 are prepared with a preparation process similar to that for preparing the EVOH resin particles of example 2. However, the preparation of the first EVOH methanol aqueous solution of example 5 has the differences as follows: an ethylene content of 38 mole %, an input pipe with a diameter of 1 mm, and a rotating knife with a rotation speed of 1000 rpm. The centrifugation and rinsing step is performed at a first-instance dehydrator rotation speed of 4000 rpm, at a water to wet particle ratio of 7 during delivery, with an open-style delivery-dedicated centrifugal pump, at a delivery pump rotation speed of 3000 rpm, at a water to wet particle weight ratio of 8 during rinsing, and at a water flow speed of 7 m/min during water rinsing. The second-instance dehydrator rotation speed is 2000 rpm. Finally, the end product of the first EVOH resin particle is ellipsoidal and has a major axis of 4 mm and a minor axis of 2 mm.

In another aspect, the preparation of the second EVOH methanol aqueous solution of embodiment 5 has the differences as follows: an ethylene content of 24 mole %, an input pipe with a diameter of 0.5 mm, and a rotating knife with a rotation speed of 1000 rpm. The centrifugation and rinsing step is performed at a first-instance dehydrator rotation speed of 5000 rpm, at a water to wet particle ratio of 9 during delivery, with a semi-open-style delivery-dedicated centrifugal pump, at a delivery pump rotation speed of 3000 rpm, at a water to wet particle weight ratio of 10 during rinsing, and at a water flow speed of 6 m/min during water rinsing. The second-instance dehydrator rotation speed is 1000 rpm. Finally, the end product of the second EVOH resin particle is ellipsoidal and has a major axis of 4 mm and a minor axis of 1 mm. Furthermore, the first EVOH resin particle and second EVOH resin particle are further mixed at a ratio by weight percentage of 35:65 wt % to prepare the EVOH resin particle composition of example 5.

First and Second EVOH Resin Particles of Comparative Example 1

The first EVOH resin particle for use in comparative example 1 is prepared with a preparation process similar to that for preparing the EVOH resin particles of example 2. However, the preparation of the first EVOH methanol aqueous solution of comparative example 1 has the differences as follows: an ethylene content of 44 mole %, an input pipe with a diameter of 2.5 mm, and a rotating knife with a rotation speed of 1200 rpm. The centrifugation and rinsing step is performed at a first-instance dehydrator rotation speed of 2000 rpm, at a water to wet particle ratio of 10 during delivery, with an open-style delivery-dedicated centrifugal pump, at a delivery pump rotation speed of 1000 rpm, at a water to wet particle weight ratio of 15 during rinsing, and at a water flow speed of 2 m/min during water rinsing. The second-instance dehydrator rotation speed is 1000 rpm. Finally, the end product of the first EVOH resin particle is spherical and has a minor axis of 3.5 mm.

In another aspect, the preparation of the second EVOH methanol aqueous solution of comparative example 1 with a preparation process similar to that for preparing the EVOH resin particles of example 1 has the differences as follows: an ethylene content of 29 mole %, a strip-cutting opening mold with a diameter of 3.5 mm, and a rotating knife with a rotation speed of 500 rpm. The centrifugation and rinsing step is performed at a first-instance dehydrator rotation speed of 1000 rpm, at a water to wet particle ratio of 15 during delivery, with an open-style delivery-dedicated centrifugal pump, at a delivery pump rotation speed of 2000 rpm, at a water to wet particle weight ratio of 20 during rinsing, and at a water flow speed of 1 m/min during water rinsing. The second-instance dehydrator rotation speed is 1000 rpm. Finally, the end product of the second EVOH resin particle is cylindrical and has a height of 5 mm and a minor axis of 4.5 mm. Furthermore, the first EVOH resin particle and second EVOH resin particle are further mixed at a ratio by weight percentage of 5:95 wt % to prepare the EVOH resin particle composition of comparative example 1.

First and Second EVOH Resin Particles of Comparative Example 2

The first EVOH resin particle for use in comparative example 2 is prepared with a preparation process similar to that for preparing the EVOH resin particles of example 2. However, the preparation of the first EVOH methanol aqueous solution of comparative example 2 has the differences as follows: an ethylene content of 35 mole %, an input pipe with a diameter of 1 mm, and a rotating knife with a rotation speed of 1500 rpm. The centrifugation and rinsing step is performed at a first-instance dehydrator rotation speed of 3000 rpm, at a water to wet particle ratio of 20 during delivery, with an open-style delivery-dedicated centrifugal pump, at a delivery pump rotation speed of 1000 rpm, at a water to wet particle weight ratio of 15 during rinsing, and at a water flow speed of 1.5 m/min during water rinsing. The second-instance dehydrator rotation speed is 2000 rpm. Finally, the end product of the first EVOH resin particle is ellipsoidal and has a major axis of 3 mm and a minor axis of 2 mm.

In another aspect, the second EVOH resin particle of comparative example 2 is prepared with a preparation process similar to that for preparing the EVOH resin particles of example 1. However, the preparation of the second EVOH methanol aqueous solution of comparative example 2 has the differences as follows: an ethylene content of 24 mole %, a strip-cutting opening mold with a diameter of 1 mm, and a rotating knife with a rotation speed of 1000 rpm. The centrifugation and rinsing step is performed at a first-instance dehydrator rotation speed of 8000 rpm, at a water to wet particle ratio of 1 during delivery, with a closed-style delivery-dedicated centrifugal pump, at a delivery pump rotation speed of 8000 rpm, at a water to wet particle weight ratio of 1 during rinsing, and at a water flow speed of 8 m/min during water rinsing. The second-instance dehydrator rotation speed is 5000 rpm. Finally, the end product of the second EVOH resin particle is cylindrical and has a height of 4 mm and a minor axis of 2 mm. Furthermore, the first EVOH resin particle and second EVOH resin particle are further mixed at a ratio by weight percentage of 75:25 wt % to prepare the EVOH resin particle composition of comparative example 2.

First and Second EVOH Resin Particles of Comparative Example 3

First and second EVOH resin particles for use in comparative example 3 are prepared with a preparation process similar to that for preparing the EVOH resin particles of example 1. However, the preparation of the first EVOH methanol aqueous solution of comparative example 3 has the differences as follows: an ethylene content of 48 mole %, a strip-cutting opening mold with a diameter of 3 mm, and a rotating knife with a rotation speed of 1700 rpm. The centrifugation and rinsing step is performed at a first-instance dehydrator rotation speed of 7000 rpm, at a water to wet particle ratio of 3 during delivery, with a closed-style delivery-dedicated centrifugal pump, at a delivery pump rotation speed of 7000 rpm, at a water to wet particle weight ratio of 1 during rinsing, and at a water flow speed of 7 m/min during water rinsing. The second-instance dehydrator rotation speed is 6000 rpm. Finally, the end product of the first EVOH resin particle is cylindrical and has a height of 2.5 mm and a minor axis of 4 mm. In another aspect, the preparation of the second methanol aqueous solution of comparative example 3 has the differences as follows: an ethylene content of 32 mole %, a strip-cutting opening mold with a diameter of 2 mm, and a rotating knife with a rotation speed of 1200 rpm. The centrifugation and rinsing step is performed at a first-instance dehydrator rotation speed of 6000 rpm, at a water to wet particle ratio of 1 during delivery, with a closed-style delivery-dedicated centrifugal pump, at a delivery pump rotation speed of 6000 rpm, at a water to wet particle weight ratio of 3 during rinsing, and at a water flow speed of 6 m/min during water rinsing. The second-instance dehydrator rotation speed is 5000 rpm. Finally, the end product of the second EVOH resin particle is cylindrical and has a height of 3.5 mm and a minor axis of 3 mm. Furthermore, the first EVOH resin particle and second EVOH resin particle are further mixed at a ratio by weight percentage of 15:85 wt % to prepare the EVOH resin particle composition of comparative example 3.

First and Second EVOH Resin Particles of Comparative Example 4

First and second EVOH resin particles for use in comparative example 4 are prepared with a preparation process similar to that for preparing the EVOH resin particles of example 2. However, the preparation of the first EVOH methanol aqueous solution of comparative example 4 has the differences as follows: an ethylene content of 38 mole %; an input pipe with a diameter of 0.5 mm, and a rotating knife with a rotation speed of 3000 rpm. The centrifugation and rinsing step is performed at a first-instance dehydrator rotation speed of 3000 rpm, at a water to wet particle ratio of 8 during delivery, with an open-style delivery-dedicated centrifugal pump, at a delivery pump rotation speed of 4000 rpm, at a water to wet particle weight ratio of 8 during rinsing, and at a water flow speed of 2.5 m/min during water rinsing. The second-instance dehydrator rotation speed is 3000 rpm. Finally, the end product of the first EVOH resin particle is spherical and has a minor axis of 1 mm. In another aspect, the preparation of the second EVOH methanol aqueous solution of comparative example 4 has the differences as follows: an ethylene content of 27 mole %, an input pipe with a diameter of 3 mm, and a rotating knife with a rotation speed of 1000 rpm. The centrifugation and rinsing step is performed at a first-instance dehydrator rotation speed of 8000 rpm, at a water to wet particle ratio of 1 during delivery, with a closed-style delivery-dedicated centrifugal pump, at a delivery pump rotation speed of 8000 rpm, at a water to wet particle weight ratio of 3 during rinsing, and at a water flow speed of 6 m/min during water rinsing. The second-instance dehydrator rotation speed is 6000 rpm. Finally, the end product of the second EVOH resin particle is spherical and has a minor axis of 4 mm. Furthermore, the first EVOH resin particle and second EVOH resin particle are further mixed at a ratio by weight percentage of 10:90 wt % to prepare the EVOH resin particle composition of comparative example 4.

First and Second EVOH Resin Particle of Comparative Example 5

First and second EVOH resin particles for use in comparative example 5 are prepared with a preparation process similar to that for preparing the EVOH resin particles of example 2. However, the preparation of the first EVOH methanol aqueous solution of comparative example 5 has the differences as follows: an ethylene content of 44 mole %, an input pipe with a diameter of 2.5 mm, and a rotating knife with a rotation speed of 1000 rpm. The centrifugation and rinsing step is performed at a first-instance dehydrator rotation speed of 1000 rpm, at a water to wet particle ratio of 10 during delivery, with an open-style delivery-dedicated centrifugal pump, at a delivery pump rotation speed of 3000 rpm, at a water to wet particle weight ratio of 10 during rinsing, and at a water flow speed of 1 m/min during water rinsing. The second-instance dehydrator rotation speed is 1000 rpm. Finally, the end product of the first EVOH resin particle is ellipsoidal and has a major axis of 4 mm and a minor axis of 3.5 mm. In another aspect, the preparation of the second EVOH methanol aqueous solution of comparative example 5 has the differences as follows: an ethylene content of 29 mole %, an Input pipe with a diameter of 0.5 mm, and a rotating knife with a rotation speed of 1700 rpm. The centrifugation and rinsing step is performed at a first-instance dehydrator rotation speed of 3000 rpm, at a water to wet particle ratio of 5 during delivery, with a closed-style delivery-dedicated centrifugal pump, at a delivery pump rotation speed of 2000 rpm, at a water to wet particle weight ratio of 10 during rinsing, and at a water flow speed of 5 m/min during water rinsing. The second-instance dehydrator rotation speed is 3000 rpm. Finally, the end product of the second EVOH resin particle is ellipsoidal and has a major axis of 2.5 mm and a minor axis of 1 mm. Furthermore, the first EVOH resin particle and second EVOH resin particle are further mixed at a ratio by weight percentage of 20:80 wt % to prepare the EVOH resin particle composition of comparative example 5.

First and Second EVOH Resin Particles of Comparative Example 6

First and second EVOH resin particles for use in comparative example 6 are prepared with a preparation process similar to that for preparing the EVOH resin particles of example 2. However, the preparation of the first EVOH methanol aqueous solution of comparative example 6 has the differences as follows: an ethylene content of 38 mole %, an input pipe with a diameter of 1.5 mm, and a rotating knife with a rotation speed of 1700 rpm. The centrifugation and rinsing step is performed at a first-instance dehydrator rotation speed of 7000 rpm, at a water to wet particle ratio of 2 during delivery, with a closed-style delivery-dedicated centrifugal pump, at a delivery pump rotation speed of 8000 rpm, at a water to wet particle weight ratio of 3 during rinsing, and at a water flow speed of 10 m/min during water rinsing. The second-instance dehydrator rotation speed is 6000 rpm. Finally, the end product of the first EVOH resin particle is spherical and has a minor axis of 2.5 mm. In another aspect, the preparation of the second EVOH methanol aqueous solution of comparative example 6 has the differences as follows: an ethylene content of 32 mole %, an input pipe with a diameter of 0.5 mm, and a rotating knife with a rotation speed of 1000 rpm. The centrifugation and rinsing step is performed at a first-instance dehydrator rotation speed of 1000 rpm, at a water to wet particle ratio of 3 during delivery, with a semi-open-style delivery-dedicated centrifugal pump, at a delivery pump rotation speed of 3000 rpm, at a water to wet particle weight ratio of 5 during rinsing, and at a water flow speed of 3 m/min during water rinsing. The second-instance dehydrator rotation speed is 4000 rpm. Finally, the end product of the second EVOH resin particle is ellipsoidal and has a major axis of 4 mm and a minor axis of 1 mm. Furthermore, the first EVOH resin particle and second EVOH resin particle are further mixed at a ratio by weight percentage of 35:65 wt % to prepare the EVOH resin particle composition of comparative example 6.

Parameters Related to EVOH Resin Particles

Parameters related to the EVOH resin particles of the disclosure and techniques for assessing/analyzing the parameters are described below.

Particle Surface Roughness

To assess/analyze the surface roughness of the EVOH resin particles in the aforesaid embodiments, it is desirable to place the EVOH resin particles flatly on a board to undergo measurement of the particle surface roughness. The measurement process entails eliminating whatever data associated with a tilting angle greater than 0.5 to ensure that the scanning planes are relatively horizontal (tilting angle=surface maximum height Sz/border length 129 µm of the analysis range). The required laser microscope is LEXT OLS5000-SAF manufactured by Olympus, producing images at an air temperature of 24±3° C. and a relative humidity of 63±3%. The filter in use is configured to operate in the "no filtering" state. The required light source has a wavelength of 405 nm. The objective lens is capable of 100× magnification (MPLAPON-100×LEXT). The optical zoom is set to 1.0×. The image area is set to be 129 µm×129 µm (The measurement of Rz is performed by focusing on the central axis in the image area.) The resolution is set to be 1024 pixels×1024 pixels. The numerical values of 100 particles are measured, and then the average is calculated. The parameters Vmp, Sku, Sp, Spk and Sxp are measured with the techniques set forth in ISO 25178:2012, whereas the parameters Ra and Rz are measured with the techniques set forth in JIS B 0601 (2001).

Ethylene Content Analysis

To assess/analyze the ethylene content of the EVOH resin particles in the aforesaid embodiments, the disclosure entails using a Raman spectrometer (manufactured by UniDRON) to measure the ethylene content of each EVOH resin particle at five points thereof randomly with a laser source having a wavelength of 473 nm and calculate the average, using the average as the ethylene content value of the EVOH resin particle samples.

Melting Point Analysis

The melting point of the EVOH resin particles is measured by the DSC Q200 device (TZERO TECHNOLOGIES, INC., with the lid (Tzero lid) being TA instrument T 170607, and the pan (Tzero pan) being TA instrument T 170620) with the techniques set forth in ISO 11357-3-2011.

In practice, in the absence of any limitations imposed by a specific theory, in case of a large number of EVOH resin particles, only 100 EVOH resin particles may be selected to obtain individual ethylene content with a related technique of analysis of ethylene contents. Then, those EVOH resin particles which have an ethylene content of 35~48 mole % are allocated to the category of EVOH resin particles with a low melting point of around 135~179° C., whereas those EVOH resin particles which have an ethylene content of 24~34 mole % are allocated to the category of EVOH resin particles with a high melting point of around 180~198° C. Furthermore, 10 EVOH resin particles are randomly selected from each of the category of EVOH resin particles with a low melting point and the category of EVOH resin particles with a high melting point to calculate their surface roughness with a surface parameter assay technique and then determine their melting points with a melting point assay technique.

Preparation and Analysis of Single-Layer EVOH Film

With the technique described below, films are formed from EVOH resin particle compositions of examples 1~5 and comparative examples 1~6, respectively. The EVOH resin particle compositions of examples 1~5 and comparative examples 1~6 are fed to a single screw extruder (Model No.: ME25/5800V4; brand: OCS) to undergo extrusion in order to prepare single-layer thin-films. The films formed from the EVOH resin particle compositions of examples 1~5 and comparative examples 1~6 have a thickness of 20 µm each. The temperature of the extruder is set to 220° C., and the rotation frequency of the screw is set to 7 rpm (rotations per minute).

Analysis of Workability of EVOH Thin-Film: Measurement and Evaluation of Gel Particles (Gel)

The gel particles of the EVOH thin-film are tested and analyzed with a charged coupled device (CCD) sensor and FSA-100 (designed with FSA-100 V.8 software). The evaluation method is as follows: if the size of the gel particles is <100 µm, the number of <450 gel particles is labeled as "O" to indicate "the best"; the number of 450~1000 gel particles is labeled as "A" to indicate "acceptable"; the number of >1000 gel particles is labeled as "X" to indicate "bad". If the size of the gel particles is 100~200 µm, the number of <50 gel particles is labeled as "O" to indicate "the best"; the number of 50~100 gel particles is labeled as "A" to indicate "acceptable"; the number of >100 gel particles is labeled as "X" to indicate "bad". If the size of the gel particles is >200 µm, the number of <10 gel particles is labeled as "O" to indicate "the best"; the number of 10~20 gel particles is labeled as "A" to indicate "acceptable"; the number of >20 particles is labeled as "X" to indicate "bad".

Analysis of Mechanical Properties of EVOH Thin-Film: Measurement and Evaluation of Thin-Film Stretching Rate A single-layer thin-film with a thickness of 180 µm is formed from EVOH with a single screw extruder. The thin-film thus formed is cut to acquire the required size of MD 30 mm*TD 90 mm (TD (transverse direction) is also known as "width direction"; MD (machine direction) is also known as "mechanical direction" or "longitudinal lengthwise direction") and then left to stand still at 130° C. for 30 minutes. Next, the thin-film undergoes a tensile force test with ASTM D882 at a tensile force speed of 1000 mm/min along the directions MD and TD. The term "stretching rate (%)" used herein is defined as [(after-stretch length-before-stretch length)/before-stretch length]*100%. The rule for the evaluation is described below. The findings are displayed by marking the "good" sign "O" to indicate that the thin-film stretching rate value manifested by the thin-film sample is greater than 1000%, the "acceptable" sign "Δ" to indicate that the thin-film stretching rate value manifested by the thin-film sample falls within the range of 800~1000%, and the "bad" sign "X" to indicate that the thin-film stretching rate value manifested by the thin-film sample is less than 800%.

Preparation of Multilayer Structure

Tie layers (for example, OREVAC® 18729, Arkema), polypropylene, and the EVOH resin particle compositions of examples 1~5 and comparative examples 1~6 undergo coextrusion to form multilayer films of examples 1~5 and comparative examples 1~6, respectively. The multilayer films each have five layers. Specifically speaking, EVOH particles (I), polypropylene(II) and binding resin (III) are each fed to a five-layer coextrusion film-forming machine to prepare multilayer sheets (II)/(III)/(I)/(III)/(II) with the structures described below and with thickness of 300/25/50/25/300 µm, respectively.

Analysis of Findings in Embodiments and Comparative Examples

The EVOH resin particle compositions of examples 1~5 and comparative examples 1~6 and the thin-films made therefrom are compared in terms of gel particle and stretching rate. The findings are shown in Table 1 and Table 2.

TABLE 1

|  | Example 1 | | Example 2 | | Example 3 | |
| --- | --- | --- | --- | --- | --- | --- |
|  | first EVOH particle | second EVOH particle | first EVOH particle | second EVOH particle | first EVOH particle | second EVOH particle |
| melting point (° C.) | 165 | 183 | 155 | 192 | 173 | 189 |
| particle shape | cylindrical | cylindrical | ellipsoidal | spherical | spherical | cylindrical |
| major axis/height (mm) | 5 | 2 | 3 | 3 | 1 | 1 |
| minor axis/radius (mm) | 1 | 3 | 2 | 3 | 1 | 5 |
| peak material volume Vmp ($\mu m^3/\mu m^2$) | 0.00001 | 0.00015 | 0.02100 | 0.22000 | 5.60000 | 18.40000 |
| kurtosis Sku | 0.0020 | 0.0070 | 0.5000 | 0.7200 | 24.3000 | 110.3000 |
| maximum peak height Sp ($\mu m$) | 0.0005 | 0.0020 | 0.0700 | 0.2300 | 28.3000 | 62.7000 |
| maximum peak portion height Spk ($\mu m$) | 0.001 | 0.003 | 0.140 | 0.550 | 1.720 | 21.600 |
| peak extreme height Sxp ($\mu m$) | 0.001 | 0.002 | 0.090 | 0.430 | 11.600 | 47.600 |
| linear arithmetic mean height Ra ($\mu m$) | 0.001 | 0.012 | 0.055 | 0.170 | 0.560 | 0.880 |
| linear maximum height Rz ($\mu m$) | 0.005 | 0.080 | 0.0170 | 0.5600 | 3.5000 | 6.5800 |
| gel (0~100 $\mu m$) | ○ | | ○ | | ○ | |
| gel (100~200 $\mu m$) | ○ | | ○ | | Δ | |
| gel (>200 $\mu m$) | ○ | | ○ | | ○ | |
| film stretching rate MD % | ○ (1071) | | ○ (1532) | | Δ (921) | |
| film stretching rate TD (%) | Δ (823) | | ○ (1321) | | ○ (1162) | |

|  | Example 4 | | Example 5 | |
| --- | --- | --- | --- | --- |
|  | first EVOH particle | second EVOH particle | first EVOH particle | second EVOH particle |
| melting point (° C.) | 155 | 183 | 173 | 198 |
| particle shape | ellipsoidal | cylindrical | ellipsoidal | ellipsoidal |
| major axis/height (mm) | 5 | 3 | 4 | 4 |
| minor axis/radius (mm) | 1 | 3 | 2 | 1 |
| peak material volume Vmp ($\mu m^3/\mu m^2$) | 0.00015 | 0.00580 | 0.87000 | 1.72000 |
| kurtosis Sku | 0.0032 | 0.0670 | 5.6400 | 21.6000 |
| maximum peak height Sp ($\mu m$) | 0.0015 | 0.0220 | 7.1000 | 18.5000 |
| maximum peak portion height Spk ($\mu m$) | 0.021 | 0.0780 | 0.560 | 3.620 |
| peak extreme height Sxp ($\mu m$) | 0.025 | 0.054 | 1.050 | 9.800 |
| linear arithmetic mean height Ra ($\mu m$) | 0.009 | 0.088 | 0.120 | 0.540 |
| linear maximum height Rz ($\mu m$) | 0.0022 | 0.0670 | 0.2500 | 3.5000 |
| gel (0~100 $\mu m$) | ○ | | ○ | |
| gel (100~200 $\mu m$) | ○ | | ○ | |
| gel (>200 $\mu m$) | ○ | | ○ | |
| film stretching rate MD % | Δ (899) | | ○ (1135) | |
| film stretching rate TD (%) | ○ (1245) | | Δ (941) | |

TABLE 2

| | Comparative Example 1 | | Comparative Example 2 | | Comparative Example 3 | |
|---|---|---|---|---|---|---|
| | first EVOH particle | second EVOH particle | first EVOH particle | second EVOH particle | first EVOH particle | second EVOH particle |
| melting point (° C.) | 165 | 189 | 178 | 198 | 155 | 183 |
| particle shape | spherical | cylindrical | ellipsoidal | cylindrical | cylindrical | cylindrical |
| major axis/height (mm) | 3.5 | 5.0 | 3.0 | 4.0 | 2.5 | 3.5 |
| minor axis/radius (mm) | 3.5 | 4.5 | 2.0 | 2.0 | 4.0 | 3.0 |
| peak material volume Vmp ($\mu m^3/\mu m^2$) | 0.000001 | 0.000003 | 0.000050 | 25.600000 | 10.200000 | 35.500000 |
| kurtosis Sku | 0.0010 | 0.0030 | 0.0016 | 153.6000 | 27.6000 | 156.7000 |
| maximum peak height Sp ($\mu m$) | 0.0001 | 0.0007 | 0.0001 | 88.9000 | 35.4000 | 83.4000 |
| maximum peak portion height Spk ($\mu m$) | 0.0005 | 0.0010 | 0.0007 | 42.7000 | 5.2000 | 32.6000 |
| peak extreme height Sxp ($\mu m$) | 0.0007 | 0.0010 | 0.0008 | 66.9000 | 21.6000 | 51.2000 |
| linear arithmetic mean height Ra ($\mu m$) | 0.007 | 0.0018 | 0.0009 | 0.9800 | 0.7700 | 0.9600 |
| linear maximum height Rz ($\mu m$) | 0.0010 | 0.0100 | 0.0005 | 8.6600 | 5.4000 | 8.3000 |
| gel (0~100 $\mu m$) | X | | X | | X | |
| gel (100~200 $\mu m$) | Δ | | X | | X | |
| gel (>200 $\mu m$) | Δ | | X | | X | |
| film stretching rate MD % | X (654) | | X (465) | | X (541) | |
| film stretching rate TD (%) | X (542) | | X (544) | | X (622) | |

| | Comparative Example 4 | | Comparative Example 5 | | Comparative Example 6 | |
|---|---|---|---|---|---|---|
| | first EVOH particle | second EVOH particle | first EVOH particle | second EVOH particle | first EVOH particle | second EVOH particle |
| melting point (° C.) | 173 | 195 | 165 | 193 | 173 | 183 |
| particle shape | spherical | spherical | ellipsoidal | ellipsoidal | spherical | ellipsoidal |
| major axis/height (mm) | 1.0 | 4.0 | 4.0 | 2.5 | 2.5 | 4.0 |
| minor axis/radius (mm) | 1.0 | 4.0 | 3.5 | 1.0 | 2.5 | 1.0 |
| peak material volume Vmp ($\mu m^3/\mu m^2$) | 0.320000 | 27.600000 | 0.000001 | 1.920000 | 15.600000 | 5.200000 |
| kurtosis Sku | 0.7100 | 131.2000 | 0.0010 | 51.6000 | 58.3000 | 10.1000 |
| maximum peak height Sp ($\mu m$) | 0.1200 | 75.6000 | 0.0001 | 1.8500 | 42.2000 | 6.700000 |
| maximum peak portion height Spk ($\mu m$) | 0.3200 | 32.4000 | 0.0003 | 1.3500 | 8.1000 | 0.5300 |
| peak extreme height Sxp ($\mu m$) | 0.1500 | 62.1000 | 0.0005 | 5.6100 | 21.3000 | 3.2200 |
| linear arithmetic mean height Ra ($\mu m$) | 0.900 | 0.9200 | 0.0005 | 0.4100 | 0.8500 | 0.2100 |
| linear maximum height Rz ($\mu m$) | 1.3200 | 9.3000 | 0.0010 | 3.2200 | 8.4000 | 3.2000 |
| gel (0~100 $\mu m$) | X | | X | | X | |
| gel (100~200 $\mu m$) | X | | X | | X | |
| gel (>200 $\mu m$) | X | | X | | X | |
| film stretching rate MD % | X (344) | | X (568) | | X (489) | |
| film stretching rate TD (%) | X (521) | | X (621) | | X (377) | |

The findings shown in Table 1 and Table 2 are explained below. Regarding the EVOH resin particle compositions of examples 1~5, the surface peak material volume (Vmp) of the first EVOH resin particles falls within the range of 0.00001~6 $\mu m^3/\mu m^2$, and the surface peak material volume (Vmp) of the second EVOH resin particles falls within the range of 0.00015~20 $\mu m^3/\mu m^2$, allowing the thin-films thus formed to exhibit satisfactory performance in terms of gel particles and stretching rate; in other words, the thin-films actually have excellent workability and mechanical properties. By contrast, regarding the EVOH resin particle compositions of comparative examples 1~6, the surface peak material volume (Vmp) of the first and second EVOH resin particles does not fall within the required numerical value range, causing the thin-films thus formed to exhibit poor workability and mechanical properties. Preferably, according to the disclosure, the second EVOH resin particle has greater Vmp than the first EVOH resin particle. Preferably, the first EVOH resin particle has a melting point of 135~179° C., and the second EVOH resin particle has a melting point of 180~198° C. Preferably, the first EVOH resin particle has an ethylene content of 36~50 mole %, and the second EVOH resin particle has an ethylene content of 20~35 mole %.

A further comparison of Table 1 and Table 2 reveals additional findings described below. Although the first EVOH resin particle of the EVOH resin particle composition of comparative example 4, the second EVOH resin particle of the EVOH resin particle composition of comparative example 5, and the second EVOH resin particle of the EVOH resin particle composition of comparative example 6 fall within the ranges of Vmp values of the first/second EVOH resin particles defined by the disclosure, respectively, none of the other EVOH resin particles of the EVOH resin particle compositions falls within the ranges of Vmp values. Thus, it is only when both of the two types of EVOH resin particles of an EVOH resin particle composition fall within the Vmp value range defined by the disclosure that the two EVOH resins can exhibit satisfactory miscibility and thereby enable thin-films thus formed to exhibit satisfactory workability and mechanical properties.

Additionally, the inventors found that the surface peak material volume (Vmp) values anticipated by the disclosure can be attained by adjusting and controlling the variables of centrifugation and rinsing in the course of processing the EVOH resin particles. Specifically speaking, in the absence of any limitations imposed by a specific theory, the surface peak material volume of the EVOH resin particles increases to a certain extent for reasons, such as overly high dehydrator rotation speed, overly low water to wet particle ratio during delivery and water rinsing, overly high delivery pump rotation speed when the centrifugation pump in operation is closed-style during delivery, and overly high water flow speed. Conversely, the surface peak material volume of the EVOH resin particles decreases to a certain extent for reasons, such as overly low dehydrator rotation speed, overly high water to wet particle ratio during delivery and water rinsing, overly low delivery pump rotation speed when the centrifugation pump in operation is open-style during delivery, and overly low water flow speed. In a specific embodiment, the dehydrator rotation speed is preferably controlled to fall within the range of 1000~5000 rpm, the water to wet particle ratio during delivery and water rinsing is preferably controlled to fall within the range of 3 to 10, the delivery pump rotation speed when the centrifugation pump in operation is closed-style during delivery is preferably not greater than 5000 rpm, the delivery pump rotation speed when the centrifugation pump in operation is open-style during delivery is preferably not less than 1000 rpm, the water flow speed during water rinsing is preferably 2~7 m/min, and the second-instance dehydrator rotation speed is preferably controlled to fall within the range of 1000~4000 rpm, so as to attain the anticipated surface peak material volume of the EVOH resin particles.

All the ranges set forth herein are intended to include every specific range that lies within a given range and include a combination of sub-ranges lying within the given range. Unless otherwise specified, every range set forth herein includes the endpoints of the range. Therefore, for example, "a range 1-5" means 1, 2, 3, 4 and 5 and includes sub-ranges, such as 2-5, 3-5, 2-3, 2-4, and 1-4.

All the publications and patent applications cited herein are hereby incorporated by reference. Furthermore, for any and all purposes, each of the publications and patent applications is definitely and individually specified to be hereby incorporated by reference. The disclosure shall prevail in case of inconsistency between the disclosure and any one of the publications and patent applications hereby incorporated by reference.

The verbs "comprise", "have" and "include" used herein are open-ended and nonrestrictive as far as their meanings are concerned. Each of the indefinite articles "an" and "a" and the definite article "the" used herein is descriptive of both a plural noun and a singular noun. The expression "one or more" used herein means "at least one" and thus refers to one single feature or a mixture/combination of features. The symbol "~" placed between two numerical values denotes an inclusive range where the two numerical values are included in the range.

Except for implementing embodiments or unless otherwise specified, all units used to describe ingredients, contents and/or reaction criteria in terms of quantity may, in all situations, be further accompanied by the preposition "around" to give allowance of a deviation of 5% from the actual numerical value specified. The expression "basically not including" or "substantially not including" used herein refers to a specific feature with a less than approximately 2% likelihood of occurrence. All essential elements or features may be negatively excluded from the appended claims even if they are definitely set forth therein.

What is claimed is:

1. An ethylene-vinyl alcohol copolymer (EVOH) resin particle composition, comprising:
    a first EVOH resin particle having a surface peak material volume (Vmp) of 0.00001~6 $\mu m^3/\mu m^2$; and
    a second EVOH resin particle having a surface peak material volume (Vmp) of 0.00015~20 $\mu m^3/\mu m^2$,
    wherein the first EVOH resin particle has an ethylene content of 36~50 mole %,
    wherein the second EVOH resin particle has an ethylene content of 20~35 mole %, and
    wherein the second EVOH resin particle has a greater Vmp than the first EVOH resin particle.

2. The EVOH resin particle composition of claim 1, wherein the first EVOH resin particle has a melting point of 135~179° C., and the second EVOH resin particle has a melting point of 180~198° C.

3. The EVOH resin particle composition of claim 1, wherein the EVOH resin particle is cylindrical, elliptic cylindrical, prismoidal, spherical, ellipsoidal or biconvex-disk-shaped and has a major axis/height of 1~5 mm and a minor axis of 1~5 mm.

4. The EVOH resin particle composition of claim 1, which has a ratio of the first EVOH resin particle to the second EVOH resin particle by weight percentage ranges from 5:95 to 75:25.

5. The EVOH resin particle composition of claim 1, wherein the EVOH resin particle composition has a boron content of 5~550 ppm.

6. The EVOH resin particle composition of claim 1, wherein the EVOH resin particle composition has an alkali metal content of 10~550 ppm.

7. The EVOH resin particle composition of claim 1, wherein the first EVOH resin particle has a kurtosis (Sku)

surface parameter of 0.0020~25, and the second EVOH resin particle has a kurtosis (Sku) surface parameter of 0.0070~111.

8. The EVOH resin particle composition of claim 1, wherein the first EVOH resin particle has a maximum peak height (Sp) surface parameter of 0.0005~29 µm, and the second EVOH resin particle has a maximum peak height (Sp) surface parameter of 0.0020~63 µm.

9. The EVOH resin particle composition of claim 1, wherein the first EVOH resin particle has a protruding peak portion height (Spk) surface parameter of 0.001~2 µm, and the second EVOH resin particle has a protruding peak portion height (Spk) surface parameter of 0.003~22 µm.

10. The EVOH resin particle composition of claim 1, wherein the first EVOH resin particle has a peak extreme height (Sxp) surface parameter of 0.001~12 µm, and the second EVOH resin particle has a peak extreme height (Sxp) surface parameter of 0.002~48 µm.

11. The EVOH resin particle composition of claim 1, wherein the first EVOH resin particle has a linear arithmetic mean height (Ra) surface parameter of 0.001~0.990 µm, and the second EVOH resin particle has a linear arithmetic mean height (Ra) surface parameter of 0.001~0.990 µm.

12. The EVOH resin particle composition of claim 1, wherein the first EVOH resin particle has a linear maximum height (Rz) surface parameter of 0.0010~9.9000 µm, and the second EVOH resin particle has a linear maximum height (Rz) surface parameter of 0.0010~9.9000 µm.

13. An ethylene-vinyl alcohol copolymer film formed from the EVOH resin particle composition of claim 1.

14. A multilayer structure, comprising:
(a) at least one layer of the ethylene-vinyl alcohol copolymer film formed from the EVOH resin particle composition of claim 1;
(b) at least one layer of a polymer layer; and
(c) at least one layer of a binding layer.

15. The multilayer structure of claim 14, wherein the polymer layer is one selected from the group consisting of a low-density polyethylene layer, polyethylene grafted maleic anhydride layer, polypropylene layer and nylon layer, and the binding layer is a tie layer.

16. The multilayer structure of claim 14, wherein the multilayer structure is a polymer layer/binding layer/ethylene-vinyl alcohol copolymer film/binding layer/polymer layer.

* * * * *